(12) United States Patent
Chen et al.

(10) Patent No.: US 10,651,990 B2
(45) Date of Patent: *May 12, 2020

(54) TECHNIQUES FOR IMPROVING URLLC COMMUNICATIONS IN NEW RADIO

(71) Applicant: QUALCOMM Incorporated, San Diego, CA (US)

(72) Inventors: Wanshi Chen, San Diego, CA (US); Peter Gaal, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/171,052

(22) Filed: Oct. 25, 2018

(65) Prior Publication Data

US 2019/0068345 A1 Feb. 28, 2019

Related U.S. Application Data

(63) Continuation of application No. 15/484,627, filed on Apr. 11, 2017, now Pat. No. 10,135,591.
(Continued)

(51) Int. Cl.
*H04L 5/00* (2006.01)
*H04L 1/18* (2006.01)
(Continued)

(52) U.S. Cl.
CPC ......... *H04L 5/0048* (2013.01); *H04B 7/0628* (2013.01); *H04L 1/1822* (2013.01);
(Continued)

(58) Field of Classification Search
CPC ... H04L 1/1812; H04L 1/1822; H04L 1/1864; H04L 1/1896
See application file for complete search history.

(56) References Cited

U.S. PATENT DOCUMENTS

| 8,971,434 B2 | 3/2015 | Frenne et al. |
| 10,135,591 B2 * | 11/2018 | Chen ................... H04B 7/0628 |

(Continued)

FOREIGN PATENT DOCUMENTS

| EP | 2733898 A2 | 5/2014 |
| WO | WO-2008118067 A2 | 10/2008 |
| WO | WO-2013071486 A1 | 5/2013 |

OTHER PUBLICATIONS

Taher et al. "Hybrid Automatic Repeat Request in LTE" (Year: 2013).*

(Continued)

*Primary Examiner* — Ross Varndell
(74) *Attorney, Agent, or Firm* — Arent Fox, LLP

(57) ABSTRACT

Various aspects described herein relate to techniques for improving ultra-reliable low-latency communications (URLLC) used in wireless communication systems (e.g., 5G New Radio). In an aspect, a method of wireless communications includes identifying at least a first hybrid automatic repeat request (HARQ) transmission and a second HARQ transmission, wherein at least one of the identified HARQ transmissions is for URLLC, receiving an indication including information of reference signal handling for the identified HARQ transmissions, and performing the reference signal handling based on the information.

22 Claims, 6 Drawing Sheets

Related U.S. Application Data

(60) Provisional application No. 62/377,401, filed on Aug. 19, 2016.

(51) Int. Cl.
*H04B 7/06* (2006.01)
*H04L 25/02* (2006.01)

(52) U.S. Cl.
CPC .......... *H04L 1/1861* (2013.01); *H04L 1/1864* (2013.01); *H04L 1/1896* (2013.01); *H04L 5/001* (2013.01); *H04L 25/0222* (2013.01); *H04L 1/1812* (2013.01)

(56) References Cited

U.S. PATENT DOCUMENTS

| | | | | |
|---|---|---|---|---|
| 2014/0169315 | A1* | 6/2014 | Han | H04L 1/1861 370/329 |
| 2017/0288817 | A1 | 10/2017 | Cao et al. | |
| 2017/0288819 | A1 | 10/2017 | Chen et al. | |
| 2017/0310431 | A1 | 10/2017 | Iyer et al. | |
| 2017/0353963 | A1 | 12/2017 | Hong et al. | |
| 2018/0019838 | A1* | 1/2018 | Yeo | H04L 1/0036 |
| 2018/0026755 | A1 | 1/2018 | Meng | |
| 2018/0034596 | A1 | 2/2018 | Noh et al. | |
| 2018/0054285 | A1 | 2/2018 | Chen et al. | |

OTHER PUBLICATIONS

International Search Report and Written Opinion—PCT/US2017/047188—ISA/EPO—dated Nov. 17, 2017.
Durisi G., et al., "Short-Packet Communications over Multiple-Antenna Rayleigh-Fading Channels", IEEE Transactions on Communications, Dec. 16, 2015, pp. 1-11.
Pitaval R-A., et al., "Spectrally-Precoded OFDM for 5G Wideband Operation in Fragmented sub-6GHz Spectrum", Huawei Technologies, 2016, pp. 1-12.
Rajagopal S., et al., "Multi-User MIMO with Flexible Numerology for 5G", Ranzure Networks and Samsung Research America, 2016, 6 Pages.
Mahmood N.H., et al.,"Radio Resource Management Techniques for eMBB and mMTC Services in 5G Dense Small Cell Scenarios", IEEE 84$^{th}$ in Vehicular Technology Conference, 2016, pp. 1-6.

* cited by examiner

TECHNIQUES FOR IMPROVING URLLC COMMUNICATIONS IN NEW RADIO

CROSS-REFERENCE TO RELATED APPLICATION

The present application is a Continuation of U.S. patent application Ser. No. 15/484,627, entitled "TECHNIQUES FOR IMPROVING URLLC COMMUNICATIONS IN NEW RADIO" and filed on Apr. 11, 2017, which claims the benefit of U.S. Provisional Application Ser. No. 62/377,401, entitled "TECHNIQUES FOR IMPROVING URLLC COMMUNICATIONS IN NEW RADIO" and filed on Aug. 19, 2016, both of which are expressly incorporated by reference herein in their entirety.

BACKGROUND

Aspects of the present disclosure relate generally to wireless communication systems, and more particularly, to techniques for improving ultra-reliable low-latency communications (URLLC) used in wireless communication systems (e.g., 5G New Radio).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., time, frequency, power, and/or spectrum). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA).

These multiple access technologies have been adopted in various telecommunication standards to provide a common protocol that enables different wireless devices to communicate on a municipal, national, regional, and even global level. An example telecommunication standard is Long Term Evolution (LTE) or LTE-Advanced (LTE-A). However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, as well as high reliability and low latency on wireless communications systems continues to increase.

The 5th Generation (5G) New Radio (NR) communications technology, used in a wide range of spectrum, is envisaged to expand and support diverse usage scenarios and applications with respect to current mobile network generations. In an aspect, 5G NR communications technology includes enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC) for a very large number of connected devices and typically transmitting a relatively low volume of non-delay-sensitive information. As the demand for mobile broadband access continues to increase, there exists a need for further improvements in 5G communications technology and beyond. Preferably, these improvements should be applicable to other multi-access technologies and the telecommunication standards that employ these technologies.

Accordingly, due to the requirements for ULRRC, new approaches may be desirable to improve system efficiency and reliability. In certain instances, as the next generation of wireless communications come into existence, specific latency and reliability requirements are needed to be met in order to ensure adequate levels of wireless communications, satisfy consumer demand and improve user experience.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

According to an example, a method for wireless communications (e.g., 5G NR) is provided. The method includes identifying at least a first hybrid automatic repeat request (HARQ) transmission and a second HARQ transmission, wherein at least one of the identified HARQ transmissions is for ultra-reliable low-latency communications (URLLC), receiving an indication including information of reference signal handling for the identified HARQ transmissions, and performing the reference signal handling based on the information.

In an aspect, an apparatus for wireless communications is provided. The apparatus may include a transmitter, a receiver, a memory, and/or one or more processors communicatively coupled to the transmitter, the receiver, and the memory. The one or more processors are configured to perform the operations of methods described herein. In an aspect, for example, the apparatus may include a receiver, a memory configured to store instructions, and at least one processor communicatively coupled to the receiver and the memory, wherein the at least one processor is configured to execute the instructions to: identify at least a first HARQ transmission and a second HARQ transmission, wherein at least one of the identified HARQ transmissions is for URLLC, receive, via the receiver, an indication including information of reference signal handling for the identified HARQ transmissions, and perform the reference signal handling based on the information.

In another aspect, an apparatus for wireless communications is provided that includes means for identifying at least a first HARQ transmission and a second HARQ transmission, wherein at least one of the identified HARQ transmissions is for URLLC, means for receiving an indication including information of reference signal handling for the identified HARQ transmissions, and means for performing the reference signal handling based on the information.

In a further aspect, a computer-readable medium (e.g., a non-transitory computer-readable storage medium) is provided including code executable by one or more processors to perform the operations of methods described herein. For example, the computer-readable medium may store computer executable code, including code for identifying at least a first HARQ transmission and a second HARQ transmission, wherein at least one of the identified HARQ transmissions is for URLLC, code for receiving an indication including information of reference signal handling for the identified HARQ transmissions, and code for performing the reference signal handling based on the information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1:
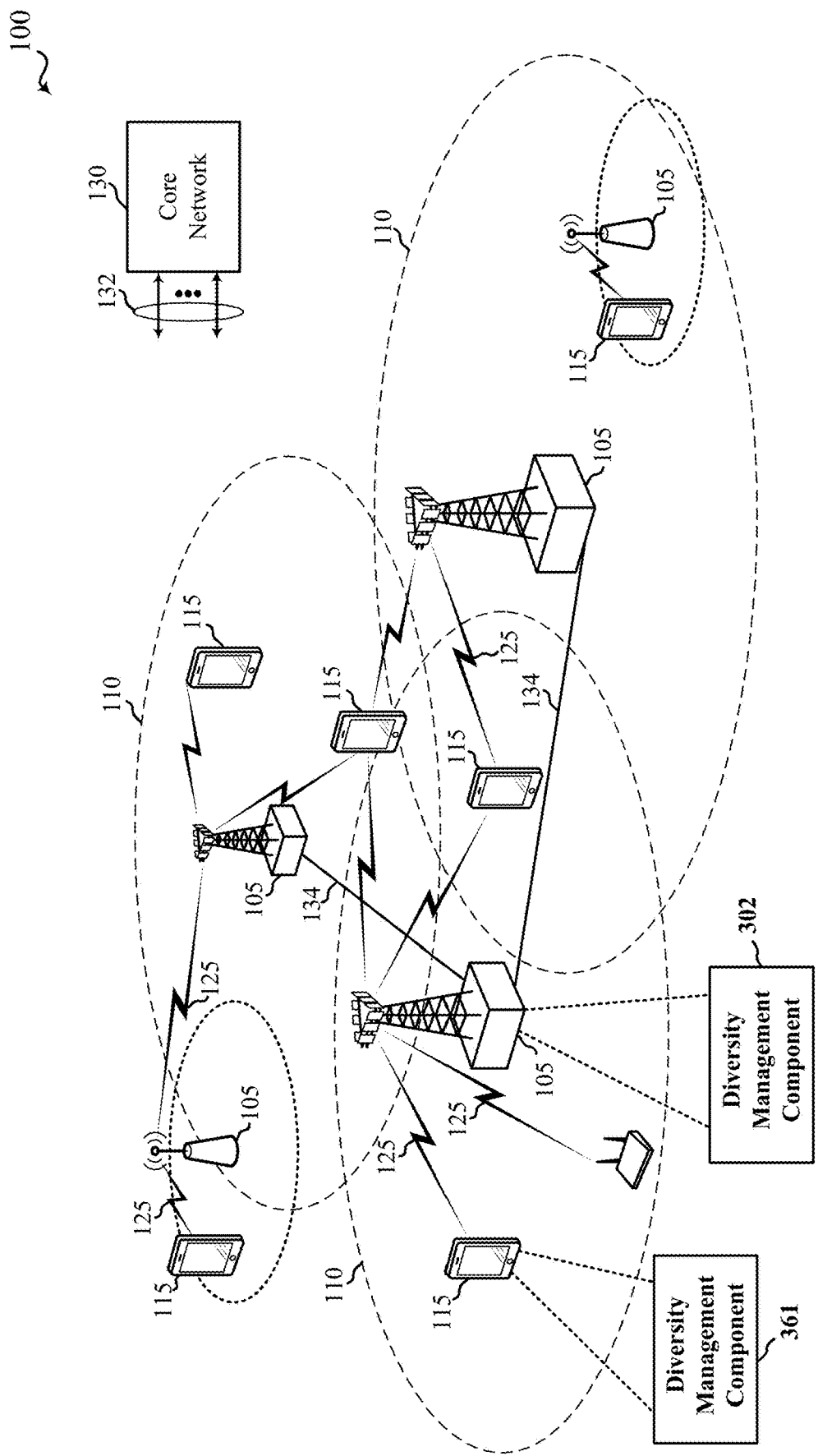
FIG. 1 shows a block diagram conceptually illustrating an example of a telecommunications system, in accordance with aspects described herein.

In a wireless communications network (e.g., the 5th Generation (5G) New Radio (NR) communications network), a wide range of spectrum may be used. To expand and support diverse usage scenarios and applications, as discussed above, 5G NR may use various types of services, for example, enhanced mobile broadband (eMBB) and ultra-reliable low-latency communications (URLLC). In some aspects, the latency and reliability requirements for URLLC are very restrict. For example, for URLLC, the requirement may be $10^{-5}$ or lower (e.g., $10^{-9}$) for block error ratio (BLER) with a 0.5 ms (or 1 ms) deadline. Therefore, the communication design that can fulfill the latency and reliability requirements for URLLC is very challenging. In particular, in an aspect, a single transmission achieving the required BLER may be very inefficient. As such, new or improved hybrid automatic repeat request (HARQ) operations may be necessary.

In some aspects, different types of services (e.g., eMBB or URLLC) may be operated at different BLER points. For example, eMBB may be operated at 10% BLER while URLLC may be operated at 0.1% BLER. As such, for different service types, there may be different needs for transmit diversity management and/or reference signal (RS) handlings for HARQ transmissions. For example, to achieve lower BLER, higher or increased diversity (e.g., channel diversity, interference diversity) may be considered for URLLC service type. In another example, because some eMBB services may have more tolerance of time delay or may operate with higher BLER, enhanced channel estimation may be considered for the eMBB services.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to improving URLLC in 5G New Radio (NR) systems. As discussed above, in addition to eMBB and massive machine type communications (mMTC), ULRRC is another type of services in 5G NR, and the latency and reliability requirements for URLLC are very tight and/or restrict. In an aspect, high reliability of transmissions may be required for both control and data channels. For example, reliability in control channels is needed to ensure proper decoding of the data in the data channels. In some examples, the control channels may be accompanying with each data transmission, or may be omitted for the first transmission (e.g., semi-persistent scheduling (SPS)).

For URLLC, in some aspects, it may be important to achieve a certain BLER target within a short duration in an efficient manner. As such, HARQ transmissions for a transport block (TB) may be necessary. In an aspect, it may be important to create some conditions such that multiple HARQ transmissions for a same TB have uncorrelated decoding performance. For example, in order to achieve $10^{-9}$ BLER, when each transmission can achieve $10^{-3}$, three uncorrelated transmissions may achieve $(10^{-3})\times(10^{-3})\times(10^{-3})=10^{-9}$. However, if the three transmissions are correlated, even after three HARQ transmissions for the same TB, the final BLER may still be higher than $10^{-9}$, because the three transmissions may end up with more towards accumulating signal-to-noise ratio (SNR), instead of creating more diversity. Therefore, it may be important to create diversity in different HARQ transmissions of a same TB. In some examples, the diversity may generate or come from some aspects, e.g., channel diversity or interference diversity.

To enhance reliability for URLLC in 5G NR, one or more mechanisms described herein may be used to manage diversity (e.g., create or increase transmit diversity) in HARQ transmissions. In an aspect, for better frequency or interference diversity, new or improved HARQ operations may be used in different component carriers (CCs). In another aspect, a user equipment (UE) may be indicated whether reference signal continuity (e.g., indication of phase coherence for channel estimation) is assumed for downlink HARQ transmissions. In other words, the UE may be indicated to choose between joint channel estimation or precoding diversity across HARQ transmissions/retransmissions. In some aspects related to uplink transmissions, a UE may be signaled an indication to control uplink procodings (e.g., precoder cycling) and/or phase shifts across uplink HARQ transmissions/retransmission. In some implementations, the uplink precodings may be semi-statically configured. In an aspect, a UE and/or the network may simultaneously support applications that use URLLC and/or eMBB, and different precoding cycling operations may be used or configured for URLLC and eMBB. In some implementations, different number of antenna ports or different set of antenna ports may be used or configured for transmitting or receiving precoded URLLC and/or eMBB signals. In another aspect, the diversity in HARQ transmissions may be created or increase by using different transmission points (TPs) on a first and subsequent HARQ transmissions/retransmissions.

In some aspects related to CCs management, a user equipment (UE) may be capable of and configured with carrier aggregation (CA). In an aspect, the CCs management and the CA may be used for increase the bandwidth of URLLC communications. In some examples, for URLLC communications, a TB used by the UE and/or a base station (e.g., an eNB) may be mapped to resources of multiple CCs, and may have different resources across multiple HARQ transmissions of the same TB. In an aspect, mapping a TB to resources of different CCs may increase frequency diversity. In some examples, to increase interference diversity, a first HARQ transmission of a TB may be mapped to a first set of resource elements (REs), and a second HARQ transmission of the TB may be mapped to a second set of REs. Accordingly, the interference from other cells may be randomized, and therefore the interference diversity may be increased. In some examples, a first HARQ transmission is mapped to a first set of sub-bands (e.g., 16 sub-bands) across CCs, and a second HARQ transmission is mapped to a second set of sub-bands (e.g., 16 sub-bands) across CCs. In an aspect, there may be linkage between the first set of sub-bands and the second set of sub-bands. In another aspect, for re-transmissions, resource allocations may be automatically hopped to a different set of resources and/or set of sub-bands even without an explicit resource allocation.

In some aspects related to downlink (DL) transmissions for URLLC, an indication or some signaling/messaging may be used for indicating the same or different reference signal (RS) handling for HARQ transmissions of a TB. In an aspect, the RS handling may be based on a relationship between (or connection of) a current HARQ transmission and a previous HARQ transmission, and the two HARQ transmissions may be in a very short time period.

In some examples, the indication may be sent from a base station (e.g., an eNB) to a UE, and indicates whether or not coherent channel estimation may be used across DL HARQ transmissions of a same TB. For example, to increase diversity, different precodings or phase shifts may be used across HARQ transmissions for a same TB, such that the channel and interference observed by different HARQ transmissions are different, which may benefit, for example, some URLLC services with specific (e.g., higher) diversity requirements. In this case, channel variation and diversity have been created or increased, and RS handling for different HARQ transmissions may not be combined. For example, the UE may not assume that a demodulation reference signal (DMRS) for a first HARQ transmission of a TB is the same as a DMRS for a second HARQ transmission of a second TB, even if the same antenna port(s) is/are utilized.

In another example, to enhance channel estimation, same precodings or phase shifts may be used across two or more HARQ transmissions for a same TB, such that coherent channel estimation may be performed for the two or more HARQ transmissions for the same TB. In this case, RS handling for different HARQ transmissions may be combined, and coherent channel estimation may be used, which may benefit some eMBB services because eMBB services may have a little more tolerance of time delay and/or may operate with higher BLER (e.g., cell edge UEs with $10^{-2}$ reliability).

In some examples, the indication may be explicit and transmitted, for example, in radio resource control (RRC) configuration, in a grant (as dynamic indication), or over a physical channel or a signal. In some other examples, the indication may be implicit by, for example, usage of different set(s) of antenna port(s) (e.g., port 7 for a first HARQ transmission, while port 8 for a second HARQ transmission), or service type dependency (e.g., eMBB associated with case 2, while URLLC associated with case 1).

In some aspects related to UL transmissions for URLLC, an indication may be used for indicating whether or not to use diversity operation for UL HARQ transmissions. In some examples, a base station (e.g., eNB) may tell UEs how to handle the UL HARQ transmission by providing or sending an indication to the UEs indicating whether or not the UEs should perform different precodings or phase shifts across HARQ transmissions of a same TB. In other words, the UEs are informed by the network how to handle UL transmissions (e.g., HARQ transmissions) including whether to perform same or different precodings or phase shifts across HARQ transmissions. For example, the UE may use a first set of precoding vector(s)/phase shifts for a first HARQ transmission, use a second set of precoding vector(s)/phase shifts for a second HARQ transmission, and use a third set of precoding vector(s)/phase shifts for a third HARQ transmission, wherein the three sets of precoding vector(s)/phase shifts may be same or different, depending on the information of the indication.

In some aspects related to UL transmissions for URLLC, an indication may be used for indicating whether or not to use diversity operations for sidelink HARQ transmissions. In some examples, a first UE may tell a second UE (or other UEs) how to handle the sidelink HARQ transmissions (e.g., the sidelink HARQ transmissions to and/or from the second UE) by providing or sending an indication to the second UE indicating whether or not the second UE may assume or perform different precodings or phase shifts across HARQ transmissions of a same TB.

In some examples, in order to increase inter-cell interference diversity, different UEs in a cell or UEs in different cells may have different selection(s) of precoding vectors. Such selection(s) may be controlled by the network (e.g., an eNB), scrambled by a cell ID, or randomly picked by the UEs. In an aspect, the UEs may be indicated the precoding vector(s) in UL grants, or the UEs may select the precoding vector(s) by themselves, which may, for example, within some restriction signaled by the network (e.g., an eNB).

In some examples, eMBB and URLLC may be operated at different BLER points. For example, after first transmission, eMBB may be operated at 10% BLER while URLLC may be operated at 0.1% BLER. As such, different transmit diversity management may be used for different service types (e.g., eMBB, URLLC). For example, at least two service types/applications, eMBB and URLLC, may be simultaneously supported by a user equipment or a network device (e.g., a base station). A first transmit diversity scheme may be used for eMBB, and a second transmit diversity scheme may be used for URLLC, wherein the first and second transmit diversity schemes may be different. In some aspects, the proposed schemes may include one or more open-loop precoding cycling operations which are dependent on the service type(s). For example, eMBB may use a first-order precoding cycling and URLLC may use a second-order precoding cycling. In particular, for service type eMBB, the precoding is performed and transmitted via a first set of antenna ports (e.g., two antenna ports), and each antenna port is associated with a set of resource elements. For service type URLLC, the precoding is performed and transmitted via a second set of antenna ports (e.g., four antenna ports), and each antenna port is associated with a set of resource elements. Therefore, when using service type dependent precoding cycling operations, URLLC may enjoy more diversity, while eMBB may benefit from more coherent channel estimation.

In some aspects, different set of TPs may be involved in transmissions and/or receptions. In some examples, different sets of TP(s) may be involved in the transmissions or receptions of a TB to allow this TB across different HARQ transmissions/re-transmissions. In DL, for example, a first TP may serve an initial transmission of a TB, a second TP may serve a first re-transmission of the TB, while both the first TP and the second TP may serve a second re-transmission of the TB. In UL, for example, a first TP receives an initial UL transmission of a TB, a second TP receives a first re-transmission of the TB, while both the first TP and the second TP may receive a second re-transmission of the TB. In some aspects, rate matching and/or quasi-co-location may be performed differently depending on the set of TP(s) involved for the transmissions.

Each of the aspects described above are performed or implemented in connection with, for example, FIGS. 1-6, which are described in more detail below.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. Access points 105 may include a diversity management component 302 configured to manage diversity (e.g., channel diversity, interference diversity) in multiple HARQ transmissions to one or more UEs 115. The diversity management component 302 may be configured to perform at least some aspects of the techniques described above for improving performance of URLLC services in wireless communications, including 5G NR. In some examples, the multiple or different HARQ transmissions may be associated with a same TB or different TBs. Similarly, one or more of UEs 115 may include a similar diversity management component 361 configured to manage diversity (e.g., channel diversity, interference diversity) and perform RS handling for multiple HARQ transmissions from/to one or more access points 105. The diversity management component 361 may also be configured to perform at least some aspects of the techniques described above for improving performance of URLLC services in wireless communications, including 5G NR. In some examples, the multiple or different HARQ transmissions may be associated with a same TB or different TBs. Some of the access points 105 may communicate with the UEs 115 under the control of a base station controller (not shown), which may be part of the core network 130 or the certain access points 105 (e.g., base stations or eNBs) in various examples.

Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals (RS), control channels, etc.), overhead information, data, etc.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In some examples, at least a portion of the wireless communications system 100 may be configured to operate on a spatial multiplexing (e.g., MIMO) scheme in which one or more of the UEs 115 and one or more of the access points 105 may be configured to support transmissions on closed-loop MIMO and/or open-loop MIMO scheme.

In network communication systems using LTE/LTE-A, 5G New Radio (NR), or similar communication technologies, the terms evolved Node B (eNodeB or eNB) may be used to describe the access points 105, though concepts described herein may be applied to other types of access points in other types of communication technologies (e.g., 5G NR). For example, the wireless communications system 100 may be a 5G NR network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 115 with service subscriptions with the network provider. A small cell may cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). A base station (e.g., an eNB) for a macro cell may be referred to as a macro base station. A base station (e.g., an eNB) for a small cell may be referred to as a small cell base station. A base station (e.g., an eNB) may support one or multiple (e.g., two, three, four, and the like) cells.

The core network 130 may communicate with the base stations or other access points 105 via one or more backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130).

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro base stations, small cell base stations, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. The MIMO techniques may include closed-loop MIMO and/or open-loop MIMO scheme. Carrier aggregation (CA) may utilize two or more CCs on a same or different serving cell for data transmission. CoMP may include techniques for coordination of transmission and reception by a number of access points 105 to improve overall transmission quality for UEs 115 as well as increasing network and spectrum utilization.

Figure 2:
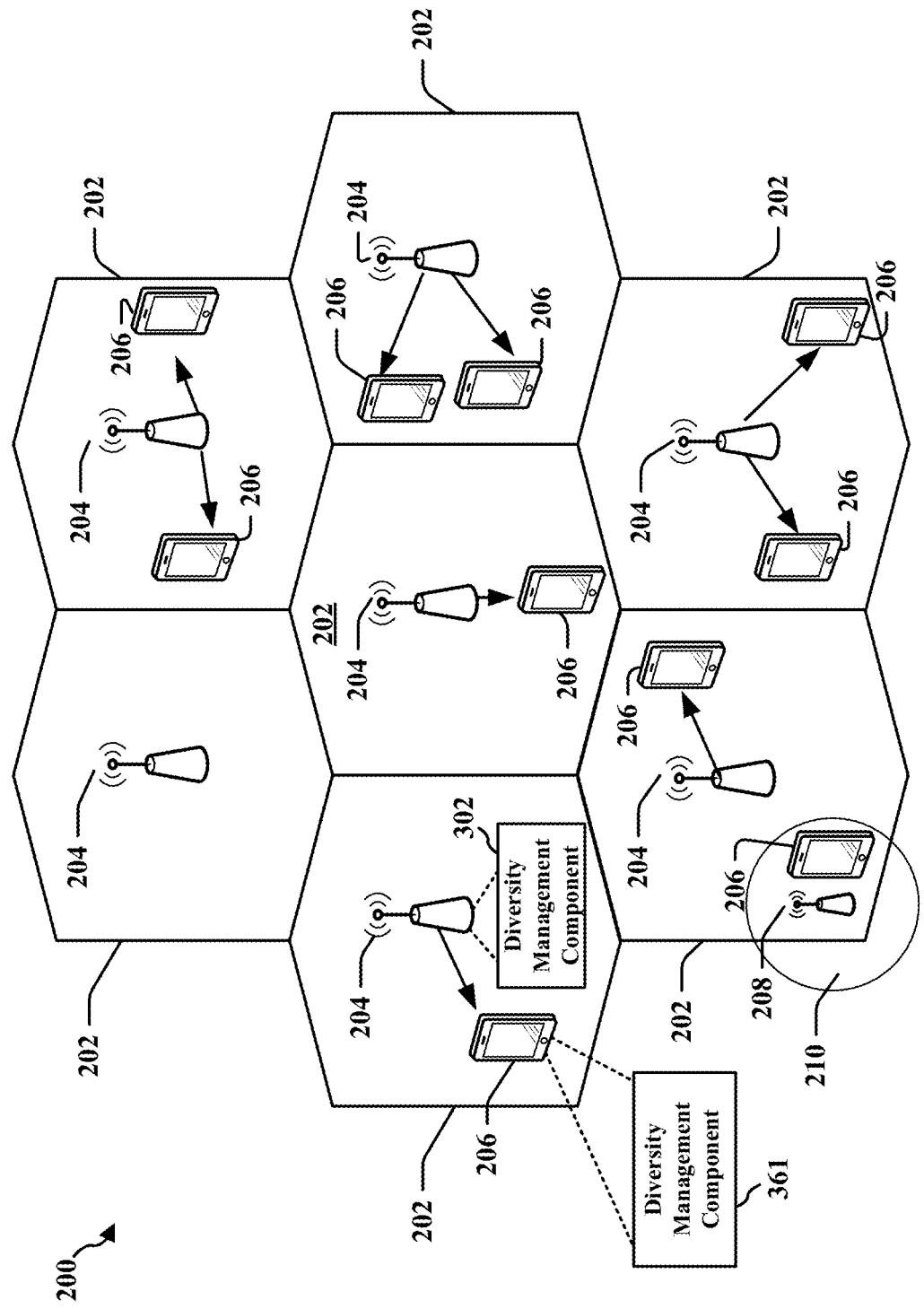
FIG. 2 is a diagram illustrating an example of an access network in accordance with aspects described herein.

FIG. 2 is a diagram illustrating an example of an access network 200 in a communication network (e.g., a 5G NR or an LTE) architecture. In this example, the access network 200 is divided into a number of cellular regions (cells) 202. One or more small cell base stations 208 may have cellular regions 210 that overlap with one or more of the cells 202. The small cell base stations 208 may provide one or more cells of a lower power class, such as a femto cell (e.g., home eNB (HeNB)), pico cell, micro cell, or remote radio head (RRH). The macro base stations 204 are each assigned to a respective cell 202 and are configured to provide an access point to the core network 130 for all the UEs 206 in the cells 202. In an aspect, base stations 204 and/or 208 may include a diversity management component 302 (see FIGS. 1, 3, and 4) configured to manage diversity (e.g., channel diversity, interference diversity) in multiple HARQ transmissions of one or more TBs to one or more UEs 206. Similarly, one or more of UEs 206 may include a diversity management component 361 (see FIGS. 1, 3, and 4) configured to manage diversity (e.g., channel diversity, interference diversity) and perform RS handling for multiple HARQ transmissions of one or more TBs from/to one or more base stations 204 and/or 208. There may be no centralized controller in this example of an access network 200, but a centralized controller may be used in alternative configurations. The base stations 204 are responsible for all radio related functions including radio bearer control, admission control, mobility control, scheduling, security, and connectivity to one or more components of core network 130.

The modulation and multiple access scheme employed by the access network 200 may vary depending on the particular telecommunications standard being deployed. In LTE applications, OFDM may be used on the downlink (DL) and SC-FDMA may be used on the uplink (UL) to support both frequency division duplexing (FDD) and time division duplexing (TDD). As those skilled in the art will readily appreciate from the detailed description to follow, the various concepts presented herein may be used for LTE/LTE-A and 5G NR applications. However, these concepts may be readily extended to other telecommunication standards or systems employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The 5th Generation (5G) New Radio (NR) communications technology, used in a wide range of spectrum, is envisaged to expand and support diverse usage scenarios and applications with respect to current and future wireless communication standards. In an aspect, 5G NR communications technology includes a type of services, called ultra-reliable low-latency communications (URLLC), which has strict requirements in terms of latency and reliability.

The actual wireless communication standard and the multiple access technology employed will depend on the specific application and the overall design constraints imposed on the system.

The base stations 204 may have multiple antennas supporting MIMO technology. The use of MIMO technology enables the base stations 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the base station 204 (e.g., eNB 204) to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
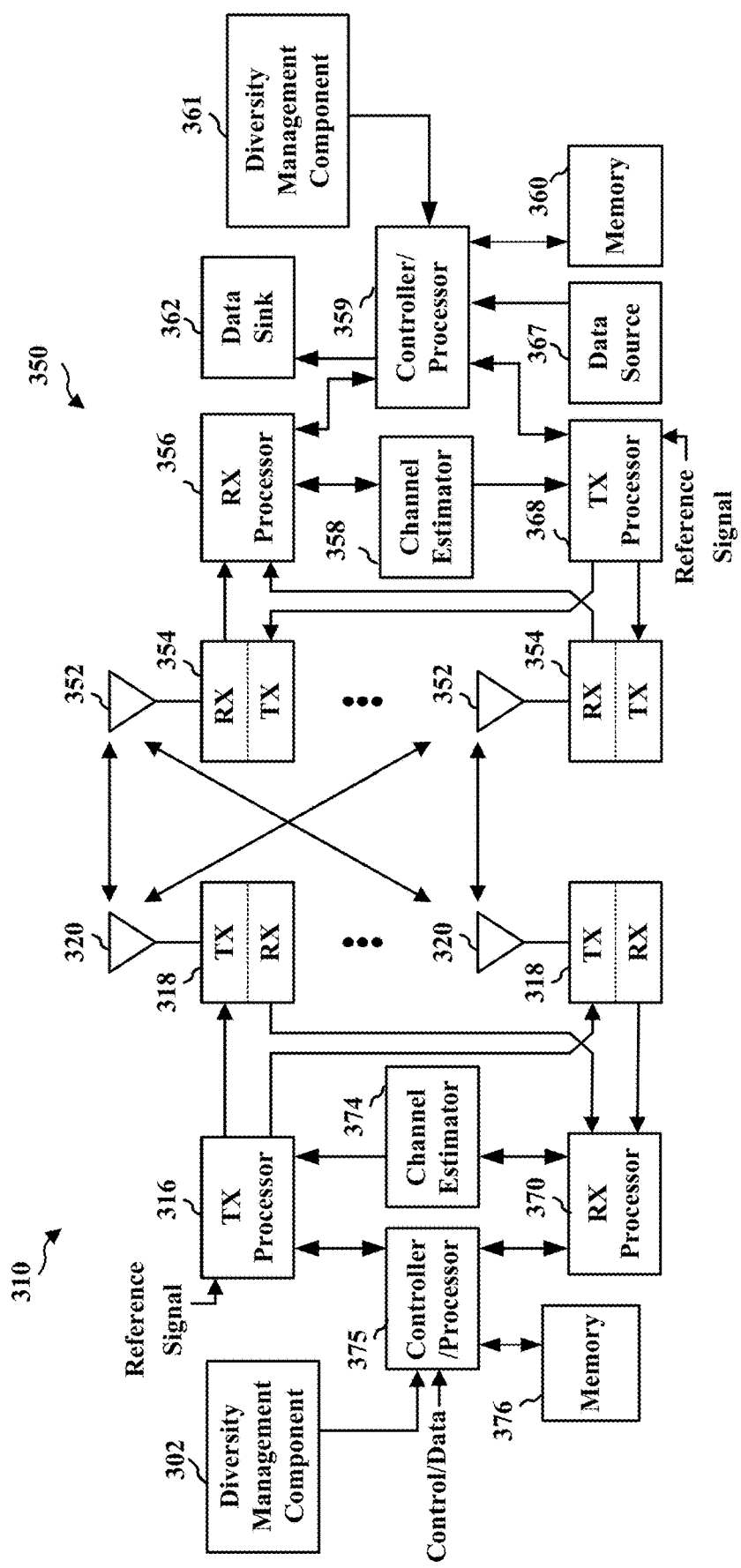
FIG. 3 is a diagram illustrating an example of a base station (e.g., an eNB) and a user equipment in an access network in accordance with aspects described herein.

FIG. 3 is a block diagram of a base station (e.g., eNB 310) in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot signal) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission. In addition, eNB 310 may include a diversity management component 302 configured to manage diversity (e.g., channel diversity, interference diversity) in multiple HARQ transmissions of one or more TBs for communicating with UE 350. Though diversity management component 302 is shown as coupled with controller/processor 375, substantially any processor of an eNB 310 can provide the functions of the diversity management component 302 and/or its related components described herein (e.g., in conjunction with controller/processor 375, memory 376, or otherwise). For example, TX processor 316 and/or RX processor 370 can additionally or alternatively provide one or more functions of diversity management component 302, as described herein.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations. In addition, UE 350 may include a diversity management component 361 configured to manage diversity (e.g., channel diversity, interference diversity) and perform RS handling for multiple HARQ transmissions of one or more TBs for communicating with one or more eNBs 310. Though diversity management component 361 is shown as coupled with controller/processor 359, substantially any processor of a UE 350 can provide the functions of the diversity management component 361 and/or its related components described herein (e.g., in conjunction with controller/processor 359, memory 360, or otherwise). For example, TX processor 368 and/or RX processor 356 can additionally or alternatively provide one or more functions of diversity management component 361, as described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
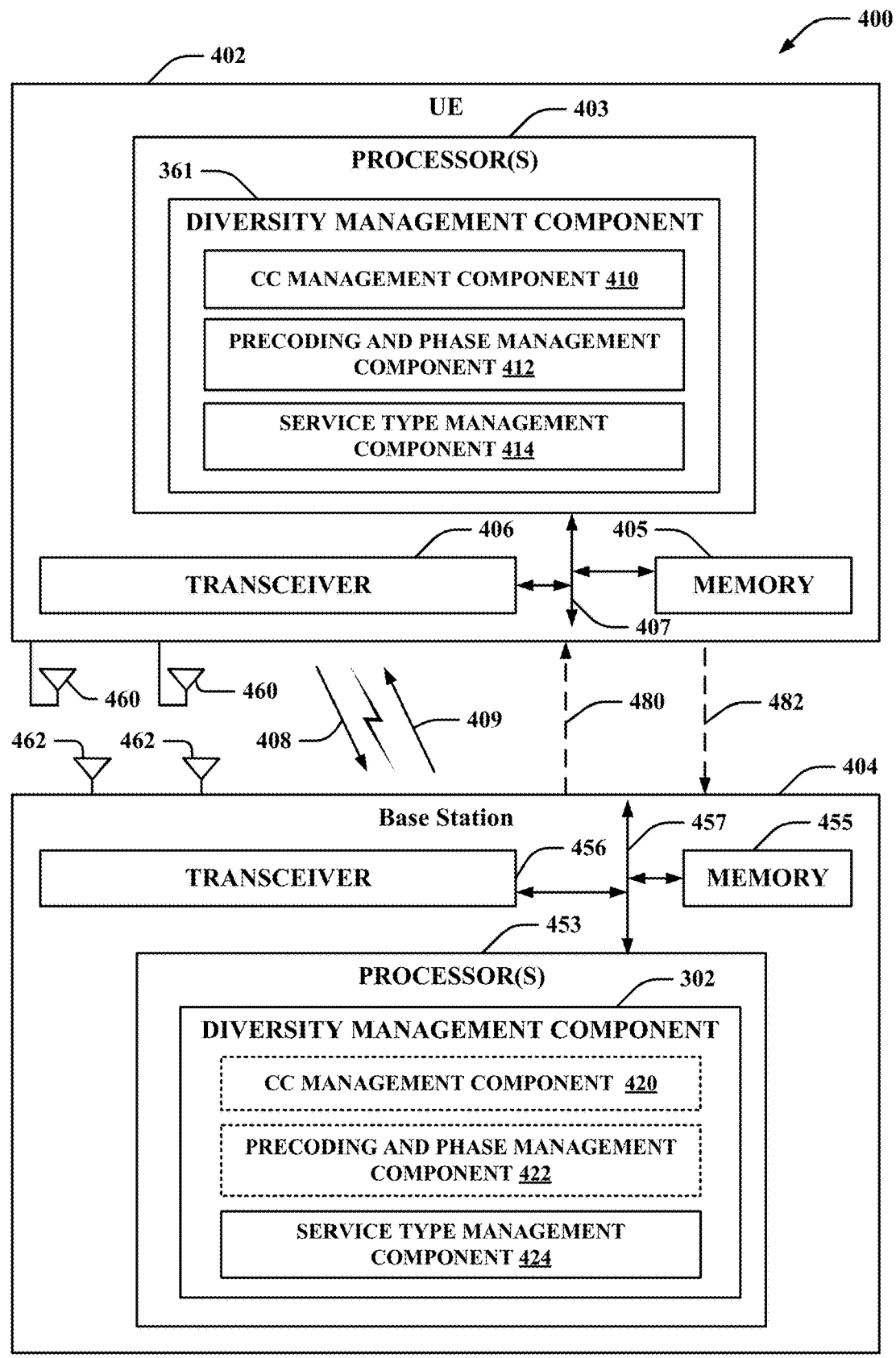
FIG. 4 is a diagram illustrating an example of a system for communicating with diversity management for ultra-reliable low-latency communications (URLLC) in accordance with various aspects described herein.

FIG. 4 illustrates an example of a system 400 using diversity management for URLLC. In some examples, the diversity management may include using or performing same or different operations (e.g., precodings or phase shifts) across HARQ transmissions/retransmissions. System 400 includes a UE 402 that communicates with an eNB 404 to access a wireless network, examples of which are described in FIGS. 1-3 (e.g., access points 105, eNB 204, small cell eNB 208, eNB 310, UEs 115, 206, 350, etc.) above. In some aspects, at least two service types or applications, eMBB and URLLC, may be simultaneously supported by the UE 402 and/or the eNB 404. In some examples discussed herein, a first transmit diversity scheme may be used for eMBB, and a second transmit diversity scheme may be used for URLLC, wherein the first and second transmit diversity schemes may be same or different.

In an aspect, eNB 404 and UE 402 may have established one or more downlink channels over which to communicate via downlink signals 409, which can be transmitted by eNB 404 (e.g., via transceiver 456) and received by UE 402 (e.g., via transceiver 406) for communicating control and/or data messages (e.g., in signaling) from the eNB 404 to the UE 402 over configured communication resources. Moreover, for example, eNB 404 and UE 402 may have established one or more uplink channels over which to communicate via uplink signals 408, which can be transmitted by UE 402 (e.g., via transceiver 406) and received by eNB 404 (e.g., via transceiver 456) for communicating control and/or data messages (e.g., in signaling) from the UE 402 to the eNB 404 over configured communication resources. As described further herein, for example, eNB 404 may communicate a configuration or an indication message 480 related to diversity management (e.g., same or different RS handling, transmit diversity scheme to be used, or antenna ports used for HARQ transmissions) for URLLC to UE 402 and/or other UEs in multiple connectivity. UE 402 may accordingly communicate feedback or HARQ transmissions/retransmissions 482 to eNB 404.

In an aspect, UE 402 may include one or more processors 403 and/or a memory 405 that may be communicatively coupled, e.g., via one or more buses 407, and may operate in conjunction with or otherwise implement a diversity management component 361 for managing diversity (e.g., channel diversity, interference diversity) and performing operations related to RS handling for multiple HARQ transmissions of one or more TBs when communicating with one or more eNBs. For example, the various operations related to diversity management component 361 may be implemented or otherwise executed by one or more processors 403 and, in an aspect, can be executed by a single processor, while in other aspects, different ones of the operations may be executed by a combination of two or more different processors.

For example, in an aspect, the one or more processors 403 may include any one or any combination of a modem processor, or a baseband processor, or a digital signal processor, or an application specific integrated circuit (ASIC), or a transmit processor, receive processor, or a transceiver processor associated with transceiver 406. Further, for example, the memory 405 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 403. Moreover, memory 405 or computer-readable storage medium may be resident in the one or more processors 403, external to the one or more processors 403, distributed across multiple entities including the one or more processors 403, etc.

In particular, the one or more processors 403 and/or memory 405 may execute actions or operations defined by diversity management component 361 or its subcomponents. For instance, the one or more processors 403 and/or memory 405 may execute actions or operations defined by a CC management component 410. In an aspect, for example, for URLLC, CC management component 410 may be configured to map a TB to a respective set of resources (e.g., a set of resource elements, or a set of sub-bands across a set of CCs), having different resources across multiple HARQ transmissions of the TB. CC management component 410 may include hardware (e.g., one or more processor modules of the one or more processors 403) and/or computer-readable code or instructions stored in memory 405 and executable by at least one of the one or more processors 403 to perform diversity related management described herein.

In addition, for instance, the one or more processors 403 and/or memory 405 may execute actions or operations defined by a precoding and phase management component 412. In an aspect, for example, for URLLC, precoding and phase management component 412 may be configured to perform various aspects of precoding and/or phase shift operations described above, for example, RS handling for DL HARQ transmissions, precodings/phase shifts for UL/DL HARQ transmissions, and/or service type dependent precoding cycling operations. Precoding and phase management component 412 may include hardware (e.g., one or more processor modules of the one or more processors 403) and/or computer-readable code or instructions stored in memory 405 and executable by at least one of the one or more processors 403 to perform precodings and/or phase shifts described herein.

Further, for instance, the one or more processors 403 and/or memory 405 may execute actions or operations defined by a service type management component 414. In an aspect, for example, for URLLC, service type management component 414 may be configured to perform various aspects of service type related operations described above, for example, identifying a UL/DL HARQ transmission for URLLC or eMBB, and/or choose a transmit diversity scheme for an identified service type (e.g., URLLC or eMBB). Service type management component 414 may include hardware (e.g., one or more processor modules of the one or more processors 403) and/or computer-readable code or instructions stored in memory 405 and executable by at least one of the one or more processors 403 to perform service type related operations or management described herein.

Similarly, in an aspect, base station/eNB 404 may include one or more processors 453 and/or a memory 455 that may be communicatively coupled, e.g., via one or more buses 457, and may operate in conjunction with or otherwise implement a diversity management component 302 for managing diversity (e.g., channel diversity, interference diversity) in multiple HARQ transmissions when communicating with one or more UEs, such as UE 402. For example, the various functions related to diversity management component 302 may be implemented or otherwise executed by one or more processors 453 and, in an aspect, can be executed by a single processor, while in other aspects, different ones of the functions may be executed by a combination of two or more different processors, as described above. In one example, the one or more processors 453 and/or memory 455 may be configured as described in examples above with respect to the one or more processors 403 and/or memory 405 of UE 402.

In an example, the one or more processors 453 and/or memory 455 may execute actions or operations defined by diversity management component 302 or its subcomponents. For instance, the one or more processors 453 and/or memory 455 may execute actions or operations defined by a CC management component 420 for URLLC to map a TB to a respective set of resources (e.g., a set of resource elements, or a set of sub-bands across a set of CCs), having different resources across multiple HARQ transmissions of the TB. In an aspect, for example, CC management component 420 may include hardware (e.g., one or more processor modules of the one or more processors 453) and/or computer-readable code or instructions stored in memory 455 and executable by at least one of the one or more processors 453 to perform diversity related management described herein.

In addition, for instance, the one or more processors 453 and/or memory 455 may execute actions or operations defined by a precoding and phase management component 422. In an aspect, for example, for URLLC, precoding and phase management component 422 may be configured to perform various aspects of precoding and/or phase shift operations described above, for example, generating indication for RS handling and/or precodings/phase shifts for DL/UL HARQ transmissions, and/or service type dependent precoding cycling operations. Precoding and phase management component 422 may include hardware (e.g., one or more processor modules of the one or more processors 453) and/or computer-readable code or instructions stored in memory 455 and executable by at least one of the one or more processors 453 to perform precodings and/or phase shifts described herein.

Further, for instance, the one or more processors 453 and/or memory 455 may execute actions or operations defined by a service type management component 424. In an aspect, for example, for URLLC, service type management component 424 may be configured to perform various aspects of service type related operations described above, for example, identifying a HARQ transmission for URLLC or eMBB, and/or choose a transmit diversity scheme for an identified service type (e.g., URLLC or eMBB). Service type management component 424 may include hardware (e.g., one or more processor modules of the one or more processors 453) and/or computer-readable code or instructions stored in memory 455 and executable by at least one of the one or more processors 453 to perform service type related operations or management described herein.

In an example, transceivers 406, 456 may be configured to transmit and receive wireless signals through one or more antennas 460, 462, one or more RF front end components (e.g., a power amplifier, low-noise amplifier, a filter, a digital-to-analog converter, an analog-to-digital converter, etc., not shown), one or more transmitters, one or more receivers, etc. In an aspect, each of the antennas 460 and 462 may include one or more antenna ports, or one or more sets of antennas ports. In an aspect, transceivers 406, 456 may be tuned to operate at specified frequencies such that UE 402 and/or eNB 404 can communicate at a certain frequency. In an aspect, the one or more processors 403 may configure transceiver 406 and/or one or more processors 453 may configure transceiver 456 to operate at a specified frequency and power level based on a configuration, a communication protocol, etc. to communicate uplink signals 408 and/or downlink signals 409, respectively, over related uplink or downlink communication channels (e.g., via one or more antennas 460, 462, or one or more antenna ports associated with antennas 460, 462).

In an aspect, transceivers 406, 456 can operate in multiple bands (e.g., using a multiband-multimode modem, not shown) such to process digital data sent and received using transceivers 406, 456. In an aspect, transceivers 406, 456 can be multiband and be configured to support multiple frequency bands for a specific communications protocol. In an aspect, transceivers 406, 456 can be configured to support multiple operating networks and communications protocols. Thus, for example, transceivers 406, 456 may enable transmission and/or reception of signals based on a specified modem configuration.

Figure 5:
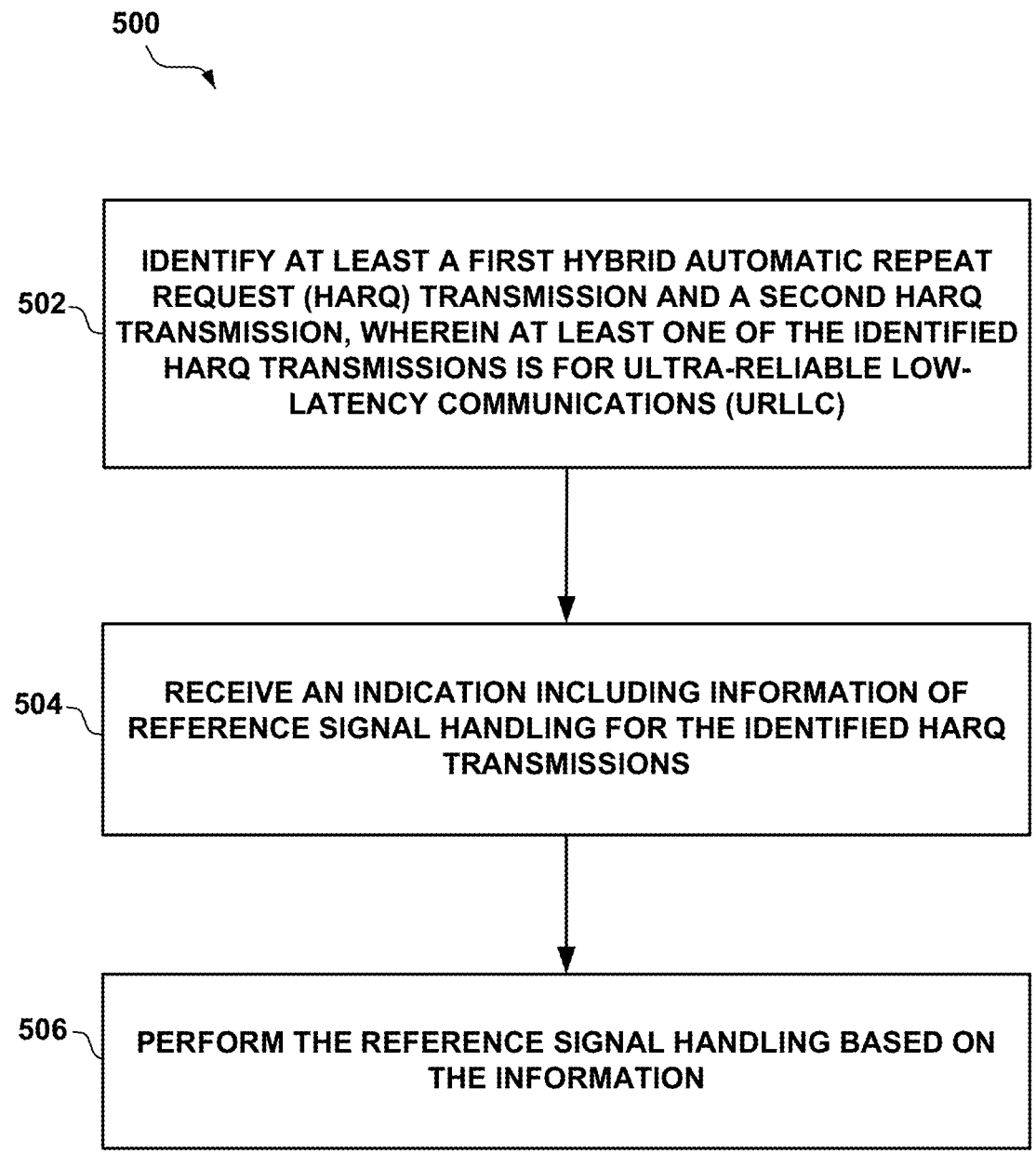
FIG. 5 is a flowchart of a first example method of downlink hybrid automatic repeat request (HARQ) operations for URLLC in accordance with aspects described herein.

Referring to FIG. 5, in an operational aspect, a UE (e.g., the UE 115 in FIG. 1, or the UE 402 of FIG. 4) or a network entity (e.g., the access point/base station 105 in FIG. 1 or the base station 404 in FIG. 4) may perform one or more aspects of a method 500 for diversity management in different HARQ transmissions of a TB.

At block 502, the method 500 may include identifying at least a first HARQ transmission and a second HARQ transmission, wherein at least one of the identified HARQ transmissions is for URLLC. In an aspect, the process of identifying may involve one or more operations (e.g., determining, monitoring). In an aspect, for example, the diversity management component 361 (FIGS. 3 and 4), the service type management component 414, e.g., in conjunction with processor(s) 403, memory 405, and/or transceiver 406, may identify at least two HARQ transmissions, and at least one of the identified HARQ transmissions is for URLLC.

At block 504, the method 500 may include receiving an indication including information of reference signal handling for the identified HARQ transmissions. In an aspect, the diversity management component 361 (FIGS. 3 and 4), e.g., in conjunction with processor(s) 403, memory 405, and/or transceiver 406, may receive an indication including information of reference signal (RS) handling for the identified HARQ transmissions at block 502. In some aspects, the indication may include information related to: 1) a relationship between a first identified HARQ transmission and a second identified HARQ transmission, 2) whether to use same or different reference signal handling (e.g., same or different precodings or phase shifts) for the identified HARQ transmissions, or 3) whether to use coherent channel estimation for the identified HARQ transmissions.

At block 506, the method 500 may include performing the reference signal handling based on the information. In an aspect, for example, the diversity management component 361, and/or the precoding and phase management component 412 (FIGS. 3 and 4), e.g., in conjunction with processor(s) 403, memory 405, and/or transceiver 406, may perform the RS handling based on the information in the indication. In some aspects, the RS handling may include using coherent channel estimation for the identified HARQ transmissions, or using same or different precodings or phase shifts for the identified HARQ transmissions.

In another aspect, the method 500 may include receiving the first HARQ transmission, and the first HARQ transmission may be precoded for a first service type and transmitted using a first set of antenna ports from a number of antenna ports, and each antenna port of the first set of antenna ports is associated with a respective set of resource elements. In an aspect, for example, the diversity management component 361, the precoding and phase management component 412, the service type management component 414, e.g., in conjunction with processor(s) 403, memory 405, and/or transceiver 406, may be configured to receive a HARQ transmission that is precoded for a service type (e.g., URLLC or eMBB) and transmitted using a set of antenna ports (e.g., one or more antenna ports associated with antenna 460 or 462), and each antenna port of the set of antenna ports is associated with a respective set of resource elements.

In an aspect, the method 500 may include receiving the second HARQ transmission, wherein the second HARQ transmission is precoded for a second service type and transmitted using a second set of antenna ports from a number of antenna ports, wherein each antenna port of the second set of antenna ports is associated with a respective set of resource elements. In an aspect, for example, the diversity management component 361, the precoding and phase management component 412, the service type management component 414, e.g., in conjunction with processor(s) 403, memory 405, and/or transceiver 406, may be configured to receive a HARQ transmission that is precoded for a service type (e.g., URLLC or eMBB) and transmitted using a set of antenna ports (e.g., one or more antenna ports associated with antenna 460 or 462), and each antenna port of the set of antenna ports is associated with a respective set of resource elements.

In another aspect of the method 500, the first service type is URLLC and the second service type is URLLC or eMBB. In an aspect, for example, the service type management component 414 may be configured to identify the service type (e.g., URLLC or eMBB) being used for the HARQ transmissions.

In an aspect of the method 500, the information in the indication indicates a number of antenna ports, or a service type, or both, associated with each identified HARQ transmission. In an aspect, for example, the diversity management component 361, the precoding and phase management component 412, the service type management component 414, e.g., in conjunction with processor(s) 403, memory 405, and/or transceiver 406, may be configured to identify the information in the received indication, e.g., the number of antenna ports used and/or the service type used, and the information in the received indication is associated with each identified HARQ transmission.

In some aspects of the method 500, the information in the indication may indicate at least one of: a relationship between the first HARQ transmission and the second HARQ transmission; that the reference signal handling includes the application of same precodings or same phase shifts to the identified HARQ transmissions; that the reference signal handling includes the application of different precodings or different phase shifts to the identified HARQ transmissions; or that coherent channel estimation is to be applied for the identified HARQ transmissions. In an aspect, for example, the diversity management component 361, the precoding and phase management component 412, e.g., in conjunction with processor(s) 403, memory 405, and/or transceiver 406, may be configured to identify the information in the received indication discussed above.

In another aspect of the method 500, the indication may be received in radio resource control (RRC) configuration, in a physical channel or signal, or dynamically in a resource grant. In an aspect, for example, the diversity management component 361, e.g., in conjunction with processor(s) 403, memory 405, and/or transceiver 406, may be configured to receive the indication via radio resource control (RRC) configuration, via a physical channel or signal, or via one or more resource grants (e.g., a UL or DL grant).

In some aspects, for each of the identified HARQ transmissions for URLLC, the method 500 may include mapping a transport block (TB) for URLLC to a respective set of resources, wherein the mapping the TB comprises: mapping the first HARQ transmission of the TB to a first set of resource elements, and the second HARQ transmission of the TB to a second set of resource elements; or mapping the first HARQ transmission to a first set of sub-bands across a first set of component carrier (CCs), and the second HARQ transmission to a second set of sub-bands across a second set of CCs. In an aspect, for example, the diversity management component 361, the CC management component 410, e.g., in conjunction with processor(s) 403, memory 405, and/or transceiver 406, may be configured to map a TB for URLLC to a respective set of resources as discussed above.

In another aspect, the method 500 may include receiving the identified HARQ transmissions in a same TB or different TBs. In an aspect, for example, the diversity management component 361, e.g., in conjunction with processor(s) 403, memory 405, and/or transceiver 406, may be configured to receive the identified HARQ transmissions in a same TB or different TBs.

In some aspects, the method 500 may include receiving a first downlink transmission of a TB from a first transmission point (TP), receiving the first HARQ transmission of the TB from a second TP, wherein the first HARQ transmission is the first retransmission of the TB, and receiving the second HARQ transmission of the TB from at least one of the first TP or the second TP, wherein the second HARQ transmission is the second retransmission of the TB. In an aspect, for example, the diversity management component 361, e.g., in conjunction with processor(s) 403, memory 405, and/or transceiver 406, may be configured to receive a first downlink transmission of a TB from a first TP, receive the first HARQ transmission of the TB from a second TP, wherein the first HARQ transmission is the first retransmission of the TB, and receive the second HARQ transmission of the TB from at least one of the first TP or the second TP, wherein the second HARQ transmission is the second retransmission of the TB.

In some aspects of the method 500, the indication may be a first indication, and the method 500 may include receiving a second indication including information for handling uplink HARQ transmissions, identifying at least two uplink HARQ transmissions of a TB, selecting a respective set of precodings or phase shifts for each identified uplink HARQ transmission based on the information in the second indication, and transmitting each of the at least two uplink HARQ transmissions based on the respective set of precodings or phase shifts. In an aspect, for example, the diversity management component 361, the precoding and phase management component 412, e.g., in conjunction with processor(s) 403, memory 405, and/or transceiver 406, may be configured to receive another indication including information for handling uplink HARQ transmissions, identify at least two uplink HARQ transmissions of a TB, select a respective set of precodings or phase shifts for each identified uplink HARQ transmission based on the information in the second indication, and transmit each of the at least two uplink HARQ transmissions.

In another aspect of the method 500, the two indications mentioned above (e.g., the first indication and the second indication) may be part of a same indication.

In an aspect of the method 500, the information in the second indication indicates that a same or different set of precodings or phase shifts for each identified uplink HARQ transmission is to be applied.

In another aspect of the method 500, the second indication is received in an uplink grant. In an aspect, for example, the diversity management component 361, e.g., in conjunction with processor(s) 403, memory 405, and/or transceiver 406, may be configured to receive an indication via one or more resource grants (e.g., a UL grant).

In some aspects, the method 500 may include transmitting a first uplink transmission of a TB to a first transmission point (TP), transmitting the first uplink HARQ transmission of the at least two uplink HARQ transmissions to a second TP, wherein the first uplink HARQ transmission is the first retransmission of the TB, and transmitting the second uplink HARQ transmission of the at least two uplink HARQ transmissions to the first TP and the second TP, wherein the second uplink HARQ transmission is the second retransmission of the TB. In an aspect, for example, the diversity management component 361, e.g., in conjunction with processor(s) 403, memory 405, and/or transceiver 406, may be configured to transmit a first uplink transmission of a TB to a first transmission point (TP), transmit the first uplink HARQ transmission of the at least two uplink HARQ transmissions to a second TP, wherein the first uplink HARQ transmission is the first retransmission of the TB, and transmit the second uplink HARQ transmission of the at least two uplink HARQ transmissions to the first TP and the second TP, wherein the second uplink HARQ transmission is the second retransmission of the TB.

Figure 6:
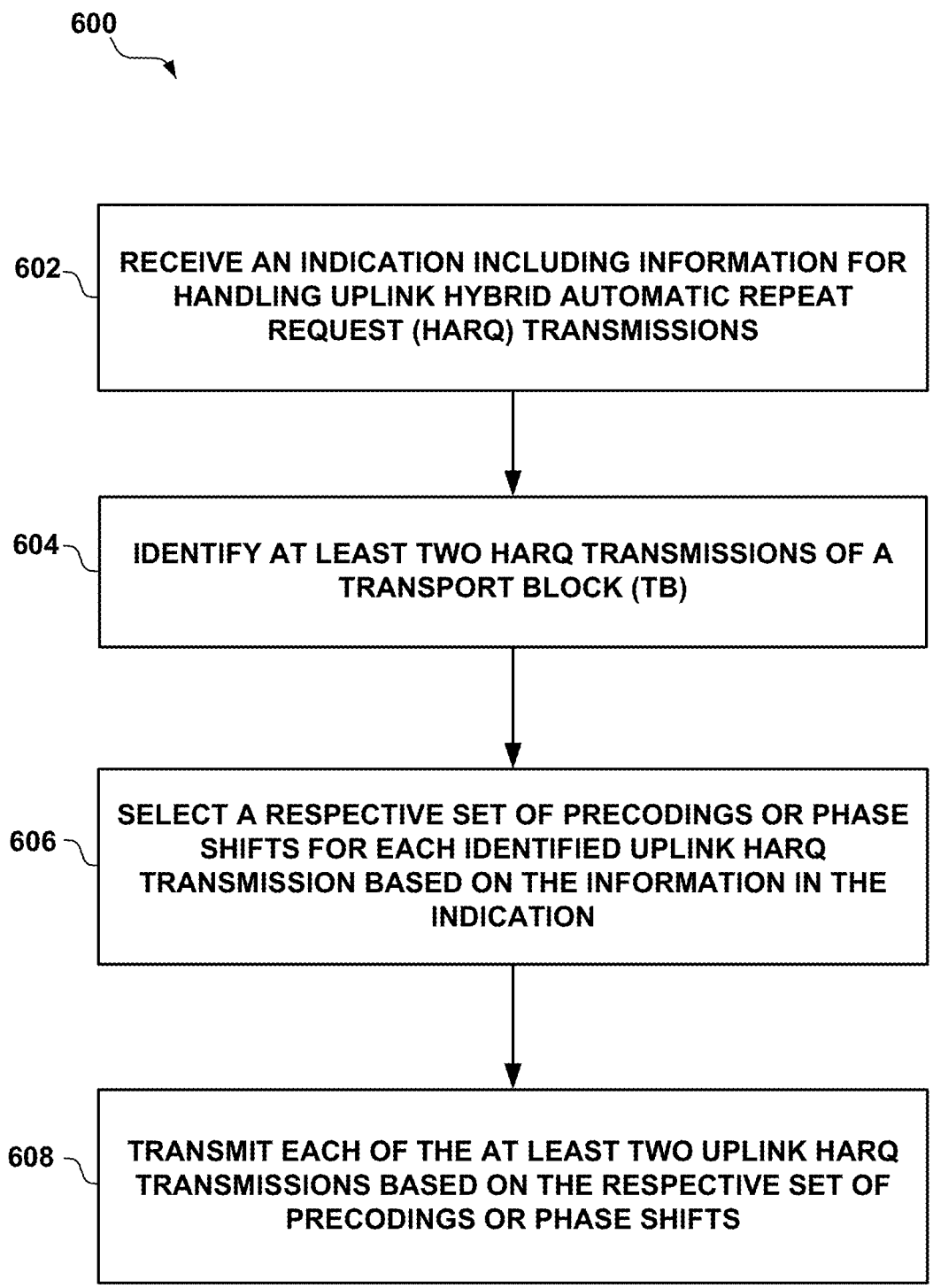
FIG. 6 is a flowchart of a second example method of uplink HARQ operations for URLLC in accordance with aspects described herein.

Referring to FIG. 6, in an operational aspect, a UE (e.g., UE 115 in FIG. 1 and UE 402 of FIG. 4) or a network entity (e.g., access point/base station 105 in FIG. 1 or base station 404 in FIG. 4) may perform one or more aspects of a method 600 for diversity management in different HARQ transmissions and/or sidelink HARQ transmissions of a TB for URLLC. In another aspect, for example, the method 600 may be performed separately, in sequence or in combination, or after performing the method 500.

At block 602, the method 600 may include receiving an indication including information for handling uplink HARQ transmissions and/or sidelink HARQ transmissions. For example, the diversity management component 361, e.g., in conjunction with processor(s) 403, memory 405, and/or transceiver 406, may receive an indication including information for handling uplink HARQ transmissions and/or sidelink HARQ transmissions.

At block 604, the method 600 may include identifying at least two HARQ transmissions of a transport block (TB). In an aspect, the process of identifying may involve one or more operations (e.g., determining, monitoring). In an aspect, for example, the diversity management component 361, e.g., in conjunction with processor(s) 403, memory 405, and/or transceiver 406, may identify the HARQ transmissions of a TB for ongoing transmission.

At block 606, the method 600 may include selecting a respective set of precodings or phase shifts for each identified uplink HARQ transmission and/or sidelink HARQ transmission based on the information in the indication. In an aspect, for example, the diversity management component 361 and the precoding and phase management component 412, e.g., in conjunction with processor(s) 403, memory 405, and/or transceiver 406, may select at least a set of precodings (e.g., precoding vectors) or phase shifts for each identified HARQ transmission based on the information in the indication received at block 602.

At block 608, the method 600 may include transmitting each of the at least two uplink HARQ transmissions based on the respective set of precodings or phase shifts. In an aspect, for example, the diversity management component 361, e.g., in conjunction with processor(s) 403, memory 405, and/or transceiver 406, may transmit the at least two uplink HARQ transmissions.

In another aspect of the method 600, the indication may indicate using the same or different sets of precodings (e.g., precoding vectors) or phase shifts for the at least two HARQ transmissions. In some examples, the at least two HARQ transmissions may include sidelink HARQ transmissions. In an aspect, for example, the diversity management component 361, the precoding and phase management component 412, e.g., in conjunction with processor(s) 403, memory 405, and/or transceiver 406, may be configured to identify the information in the received indication discussed above.

In an aspect of the method 600, the indication is received in radio resource control (RRC) configuration, in a physical channel or signal, or in an uplink grant. In an aspect, for example, the diversity management component 361, e.g., in conjunction with processor(s) 403, memory 405, and/or transceiver 406, may be configured to receive the indication via radio resource control (RRC) configuration, via a physical channel or signal, or via an uplink grant.

In some aspects of the method 600, the indication is transmitted using different antenna ports or different service types, wherein the service types include at least eMBB or URLLC. In an aspect, for example, the diversity management component 361, and the service type management component 414, e.g., in conjunction with processor(s) 403, memory 405, and/or transceiver 406, may be configured to identify the information in the received indication, e.g., the number of antenna ports (e.g., 2 or 4) used and/or the service type used (e.g., eMBB or URLLC).

In another aspect of the method 600, the respective set of precodings (e.g., precoding vectors) or phase shifts may be selected by a base station, scrambled by a cell ID, or randomly picked by a UE. In an aspect, for example, the respective set of precodings (e.g., precoding vectors) or phase shifts may be selected by a network entity (e.g., access point/base station 105 in FIG. 1 or base station 404 in FIG. 4). In another aspect, for example, the diversity management component 361, and the service type management component 414, e.g., in conjunction with processor(s) 403, memory 405, and/or transceiver 406, may be configured to perform a selection of the respective set of precodings or phase shifts (e.g., based on a cell ID).

While, for purposes of simplicity of explanation, the methods discussed herein are shown and described as a series of acts, it is to be understood and appreciated that the methods (and further methods related thereto) are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Several aspects of a telecommunications system have been presented with reference to a 5G NR communication system. As those skilled in the art will readily appreciate, various aspects described throughout this disclosure may be extended to other telecommunication systems, network architectures and communication standards.

By way of example, various aspects may be extended to other communication systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or 35 U.S.C. § 112, sixth paragraph, unless the element is expressly recited using the phrase "means for" or, in the case of a method claim, the element is recited using the phrase "step for."

What is claimed is:

1. A method of wireless communications, comprising:
identifying at least a first hybrid automatic repeat request (HARQ) transmission and a second HARQ transmission, wherein at least one of the identified HARQ transmissions is for ultra-reliable low-latency communications (URLLC);
for each of the identified HARQ transmissions for URLLC, mapping a transport block (TB) for URLLC to a respective set of resources, wherein the mapping the TB comprises:
mapping the first HARQ transmission of the TB to a first set of resource elements, and the second HARQ transmission of the TB to a second set of resource elements; or
mapping the first HARQ transmission to a first set of sub-bands across a first component carrier (CC), and the second HARQ transmission to a second set of sub-bands across a second CC;
receiving an indication including information of reference signal handling for the identified HARQ transmissions;
performing the reference signal handling based on the information;
receiving the first HARQ transmission, wherein the first HARQ transmission is precoded for a first service type and transmitted using a first set of antenna ports from a number of antenna ports, wherein each antenna port of the first set of antenna ports is associated with a respective set of resource elements; and
receiving the second HARQ transmission, wherein the second HARQ transmission is precoded for a second service type and transmitted using a second set of antenna ports from a number of antenna ports, wherein each antenna port of the second set of antenna ports is associated with a respective set of resource elements.

2. The method of claim 1, wherein the first service type is URLLC and the second service type is URLLC or enhanced Mobile Broadband (eMBB).

3. The method of claim 1, wherein the information in the indication indicates a number of antenna ports, or a service type, or both, associated with each identified HARQ transmission.

4. The method of claim 1, wherein the indication is received in radio resource control (RRC) configuration, in a physical channel or signal, or dynamically in a resource grant.

5. The method of claim 1, further comprising receiving the identified HARQ transmissions in a same TB or different TBs.

6. A method of wireless communications, comprising:
identifying at least a first hybrid automatic repeat request (HARQ) transmission and a second HARQ transmission, wherein at least one of the identified HARQ transmissions is for ultra-reliable low-latency communications (URLLC);
for each of the identified HARQ transmissions for URLLC, mapping a transport block (TB) for URLLC to a respective set of resources, wherein the mapping the TB comprises:
mapping the first HARQ transmission of the TB to a first set of resource elements, and the second HARQ transmission of the TB to a second set of resource elements; or
mapping the first HARQ transmission to a first set of sub-bands across a first component carrier (CC), and the second HARQ transmission to a second set of sub-bands across a second CC;
receiving an indication including information of reference signal handling for the identified HARQ transmissions;
performing the reference signal handling based on the information;
receiving a first downlink transmission of a TB from a first transmission point (TP);
receiving the first HARQ transmission of the TB from a second TP, wherein the first HARQ transmission is the first retransmission of the TB; and
receiving the second HARQ transmission of the TB from at least one of the first TP or the second TP, wherein the second HARQ transmission is the second retransmission of the TB.

7. A method of wireless communications, comprising:
identifying at least a first hybrid automatic repeat request (HARQ) transmission and a second HARQ transmission, wherein at least one of the identified HARQ transmissions is for ultra-reliable low-latency communications (URLLC);
for each of the identified HARQ transmissions for URLLC, mapping a transport block (TB) for URLLC to a respective set of resources, wherein the mapping the TB comprises:
mapping the first HARQ transmission of the TB to a first set of resource elements, and the second HARQ transmission of the TB to a second set of resource elements; or
mapping the first HARQ transmission to a first set of sub-bands across a first component carrier (CC), and the second HARQ transmission to a second set of sub-bands across a second CC;
receiving a first indication including information of reference signal handling for the identified HARQ transmissions;
performing the reference signal handling based on the information in the first indication;
receiving a second indication including information for handling uplink HARQ transmissions;
identifying at least two uplink HARQ transmissions of a TB;
selecting a respective set of precodings or phase shifts for each identified uplink HARQ transmission based on the information in the second indication; and
transmitting each of the at least two uplink HARQ transmissions based on the respective set of precodings or phase shifts.

8. The method of claim 7, wherein the first indication and the second indication are part of a same indication.

9. The method of claim 7, wherein the information in the second indication indicates that a same or different set of precodings or phase shifts for each identified uplink HARQ transmission is to be applied.

10. The method of claim 7, wherein the second indication is received in an uplink grant.

11. The method of claim 7, wherein the transmitting further comprises:
transmitting a first uplink transmission of a TB to a first transmission point (TP);
transmitting the first uplink HARQ transmission of the at least two uplink HARQ transmissions to a second TP, wherein the first uplink HARQ transmission is the first retransmission of the TB; and
transmitting the second uplink HARQ transmission of the at least two uplink HARQ transmissions to the first TP and the second TP, wherein the second uplink HARQ transmission is the second retransmission of the TB.

12. An apparatus for wireless communications, comprising:
 a receiver;
 a memory configured to store instructions; and
 at least one processor communicatively coupled to the receiver and the memory, wherein the at least one processor is configured to execute the instructions to:
  identify at least a first hybrid automatic repeat request (HARQ) transmission and a second HARQ transmission, wherein at least one of the identified HARQ transmissions is for ultra-reliable low-latency communications (URLLC);
  for each of the identified HARQ transmissions for URLLC, map a transport block (TB) for URLLC to a respective set of resources, wherein the mapping the TB comprises:
   map the first HARQ transmission of the TB to a first set of resource elements, and the second HARQ transmission of the TB to a second set of resource elements; or
   map the first HARQ transmission to a first set of sub-bands across a first component carrier (CC), and the second HARQ transmission to a second set of sub-bands across a second CC;
  receive, via the receiver, an indication including information of reference signal handling for the identified HARQ transmissions;
  perform the reference signal handling based on the information;
  receive, via the receiver, the first HARQ transmission, wherein the first HARQ transmission is precoded for a first service type and transmitted using a first set of antenna ports from a number of antenna ports, wherein each antenna port of the first set of antenna ports is associated with a respective set of resource elements; and
  receive, via the receiver, the second HARQ transmission, wherein the second HARQ transmission is precoded for a second service type and transmitted using a second set of antenna ports from a number of antenna ports, wherein each antenna port of the second set of antenna ports is associated with a respective set of resource elements.

13. The apparatus of claim 12, wherein the first service type is URLLC and the second service type is URLLC or enhanced Mobile Broadband (eMBB).

14. The apparatus of claim 12, wherein the information in the indication indicates a number of antenna ports, or a service type, or both, associated with each identified HARQ transmission.

15. The apparatus of claim 12, wherein the indication is received in radio resource control (RRC) configuration, in a physical channel or signal, or dynamically in a resource grant.

16. The apparatus of claim 12, wherein the at least one processor is configured to execute further instructions to receive, via the receiver, the identified HARQ transmissions in a same TB or different TBs.

17. An apparatus for wireless communications, comprising:
 a receiver;
 a memory configured to store instructions; and
 at least one processor communicatively coupled to the receiver and the memory, wherein the at least one processor is configured to execute the instructions to:
  identify at least a first hybrid automatic repeat request (HARQ) transmission and a second HARQ transmission, wherein at least one of the identified HARQ transmissions is for ultra-reliable low-latency communications (URLLC);
  for each of the identified HARQ transmissions for URLLC, map a transport block (TB) for URLLC to a respective set of resources, wherein the mapping the TB comprises:
   map the first HARQ transmission of the TB to a first set of resource elements, and the second HARQ transmission of the TB to a second set of resource elements; or
   map the first HARQ transmission to a first set of sub-bands across a first component carrier (CC), and the second HARQ transmission to a second set of sub-bands across a second CC;
  receive, via the receiver, an indication including information of reference signal handling for the identified HARQ transmissions;
  perform the reference signal handling based on the information;
  receive, via the receiver, a first downlink transmission of a TB from a first transmission point (TP);
  receive, via the receiver, the first HARQ transmission of the TB from a second TP, wherein the first HARQ transmission is the first retransmission of the TB; and
  receive, via the receiver, the second HARQ transmission of the TB from at least one of the first TP or the second TP, wherein the second HARQ transmission is the second retransmission of the TB.

18. An apparatus for wireless communications, comprising:
 a receiver;
 a transmitter;
 a memory configured to store instructions; and
 at least one processor communicatively coupled to the receiver, the transmitter and the memory, wherein the at least one processor is configured to execute the instructions to:
  identify at least a first hybrid automatic repeat request (HARQ) transmission and a second HARQ transmission, wherein at least one of the identified HARQ transmissions is for ultra-reliable low-latency communications (URLLC);
  for each of the identified HARQ transmissions for URLLC, map a transport block (TB) for URLLC to a respective set of resources, wherein the mapping the TB comprises:
   map the first HARQ transmission of the TB to a first set of resource elements, and the second HARQ transmission of the TB to a second set of resource elements; or
   map the first HARQ transmission to a first set of sub-bands across a first component carrier (CC), and the second HARQ transmission to a second set of sub-bands across a second CC;
  receive, via the receiver, a first indication including information of reference signal handling for the identified HARQ transmissions;
  perform the reference signal handling based on the information in the first indication;
  receive, via the receiver, a second indication including information for handling uplink HARQ transmissions;
  identify at least two uplink HARQ transmissions of a TB;

select a respective set of precodings or phase shifts for each identified uplink HARQ transmission based on the information in the second indication; and transmit, via the transmitter, each of the at least two uplink HARQ transmissions based on the respective set of precodings or phase shifts.

19. The apparatus of claim 18, wherein the first indication and the second indication are part of a same indication.

20. The apparatus of claim 18, wherein the information in the second indication indicates that a same or different set of precodings or phase shifts for each identified uplink HARQ transmission is to be applied.

21. The apparatus of claim 18, wherein the second indication is received in an uplink grant.

22. The apparatus of claim 18, wherein the transmitting further comprises:

transmit, via the transmitter, a first uplink transmission of a TB to a first transmission point (TP);

transmit, via the transmitter, the first uplink HARQ transmission of the at least two uplink HARQ transmissions to a second TP, wherein the first uplink HARQ transmission is the first retransmission of the TB; and transmit, via the transmitter, the second uplink HARQ transmission of the at least two uplink HARQ transmissions to the first TP and the second TP, wherein the second uplink HARQ transmission is the second retransmission of the TB.

* * * * *